Figure 1:
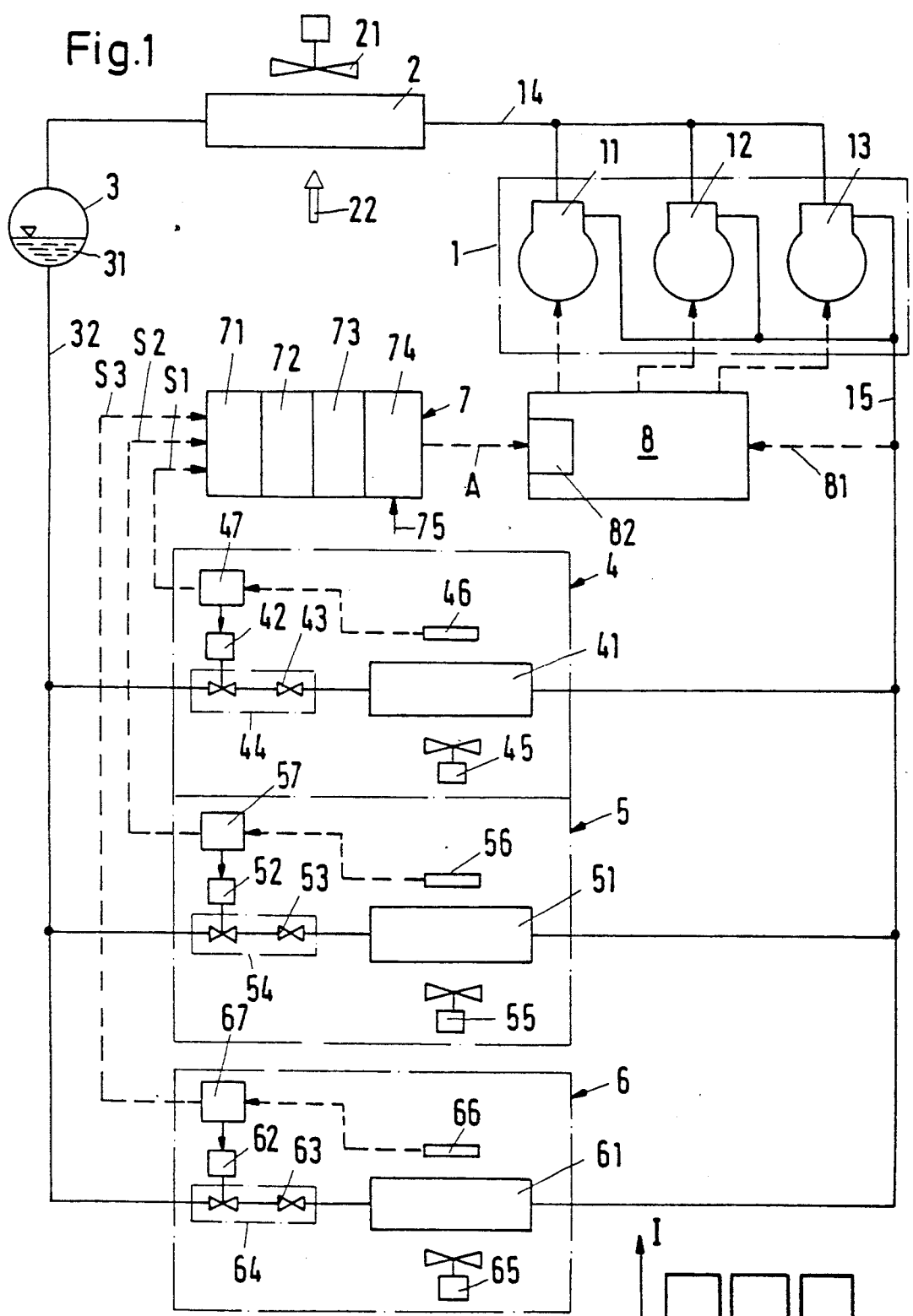

United States Patent [19]
Valbjorn

[11] Patent Number: 5,131,237
[45] Date of Patent: Jul. 21, 1992

[54] CONTROL ARRANGEMENT FOR A REFRIGERATION APPARATUS

[75] Inventor: Knud V. Valbjørn, Nordborg, Denmark

[73] Assignee: Danfoss A/S, Nordborg, Denmark

[21] Appl. No.: 659,709

[22] Filed: Feb. 25, 1991

[30] Foreign Application Priority Data

Apr. 4, 1990 [DE] Fed. Rep. of Germany ....... 4010770

[51] Int. Cl.⁵ ............................................. F25B 41/04
[52] U.S. Cl. ....................................... 62/175; 62/204; 62/223
[58] Field of Search ................. 62/204, 223, 226, 227, 62/229, 210, 175

[56] References Cited

U.S. PATENT DOCUMENTS 4,926,653 5/1990 Masuaa et al. ........................ 62/204

FOREIGN PATENT DOCUMENTS 0282772 9/1988 European Pat. Off. .............. 62/204
2191313 12/1987 United Kingdom ................... 62/204

*Primary Examiner*—William E. Wayner
*Attorney, Agent, or Firm*—Wayne B. Easton; Johnson Clayton R.

[57] ABSTRACT

A refrigeration system having compressor controls responsive to the heat load on the system. Each selected evaporator of the system has a thermostatic switch unit which includes an associated temperature sensor in proximity to the evaporator. The thermostatic switch unit has an operating range with ON and OFF threshold values and function to operate an electromagnetic valve which controls the refrigerant admitted to the evaporator. The heat load to which the compressor controls are responsive is derived from the accumulated ON and OFF times of the switch insert.

4 Claims, 1 Drawing Sheet

CONTROL ARRANGEMENT FOR A REFRIGERATION APPARATUS

The invention relates to a control arrangement for a refrigeration apparatus having a compressor arrangement, the output of which can be varied, a condenser, optionally a collector and at least two evaporators that are connected in parallel and have an expansion apparatus connected upstream, in which control apparatus there is associated with each evaporator a temperature sensor, a valve controlled by the latter and a state of load indicating means that is dependent on the state of the valve, and in which a control apparatus is provided that changes the output of the compressor arrangement as a function of the state of the load of the most heavily loaded evaporator.

In a known control arrangement of that type (U.S. Pat. Ser. No. 40 84 388) there are four compressors which can be switched on and off by a common control apparatus. They feed three evaporators connected in parallel, downstream of each of which is connected, on the suction side, a valve that is influenced by the temperature sensor. The valve setting is a measure of the suction pressure in the evaporator and therefore of its load. State of load indicating means provide load signals corresponding to the valve setting, the greatest of which signals is selected by means of a diode circuit and supplied to the control apparatus. The latter compares the maximum load value with three threshold values of 125%, 90% and 80% and, as a function of that comparison, determines the number of compressors in operation.

A disadvantage of that is that the valve setting is only a very imprecise indication of the state of load. This is especially true of the upper threshold region, where substantial valve displacements effect virtually no changes in throughflow. In addition, the pressure drop at the valve in the case of the less heavily loaded evaporators leads to an increase in the output pressure of the evaporator and hence to low efficiency.

It is also known (Danfoss A/S Refrigeration Unit Controller AK10) to connect upstream of the evaporator, on the pressure side, an electro-magnetic valve having an integral expansion nozzle, which valve is switched on and off alternately. It can be controlled in accordance with the principle of pulse width modulation with fixed period. That mode of operation can also have superimposed on it control by the state of a thermostatic switch associated with the evaporator.

The problem on which the invention is based is to provide a control arrangement of the type described in the introduction that ensures that the refrigeration apparatus is operated at the lowest possible output under any load.

That problem is solved according to the invention as follows: the valves are electro-magnetic valves connected upstream of the evaporators, the switch-on value "on" to switch-off value "off" ratio of the valves being influenced by the associated temperature sensor; the state of load indicating means provide signals corresponding to "on" and "off"; and the control apparatus has a computation circuit that calculates for each evaporator, as load value B, the relative switch-on ratio $$\frac{on}{on + off},$$

and adjusts the output of the compressor arrangement so that the greatest load value $B_{max}$ is close to 1.

The switch-on ratio of the electro-magnetic valves, which is influenced by the temperature sensor, is a very precise measure of the evaporator load. It is easily calculated, since the switch-on time and the switch-off time automatically arise during operation. The precision applies over the entire load range, even in the upper threshold region. When operating at values of $B_{max}$ that are close to 1, therefore, it is ensured, on the one hand, that the most heavily loaded evaporator is supplied virtually constantly with the full amount of refrigerant, but, on the other hand, it is still possible for the control apparatus to respond if, as a result of inadequate compressor output, the electro-magnetic valve is open constantly or virtually constantly. As a result, the compressor arrangement can be operated at just that output at which the suction pressure is at its highest value under the given circumstances. This results in the smallest possible pressure ratio (condensation pressure/suction pressure) at the compressor arrangement, which can therefore be operated at a very low output. In addition, the logarithmic temperature difference LMTD for the evaporators is comparatively small, which reduces the drying out of the refrigerated goods. The suction sides of the evaporators can be connected directly to the suction side of the compressor arrangement, so that no compressor output is lost as a result of pressure drops on the suction side. By switching compressor output on and off, the control apparatus is able to reduce or increase the suction pressure and in that way to ensure that the evaporator that is loaded to the maximum extent is supplied with refrigerant virtually continuously. Altogether, therefore, the refrigeration apparatus can be operated at an output that is very low for the load.

It is advantageous for the temperature sensors to belong to thermostatic switches that open the associated electro-magnetic valves when they go below their lower temperature threshold value and close them when they exceed their upper temperature threshold value. That direct control results in an especially simple construction.

It is further recommended that the electro-magnetic valves be connected to the expansion valve to form a unit. That facilitates the construction.

In detail, it should be ensured that the control apparatus acts to reduce the output of the compressor arrangement if $B_{max}$ falls below a lower threshold value that is greater than 0.85. The lower threshold value may, in particular, be from 0.90 to 0.95. The higher that that threshold value is set, the more the compressor can be utilised to its full refrigerating capacity.

On the other hand, the control apparatus should act to increase the output of the compressor arrangement if $B_{max}$ exceeds an upper threshold value that is lower than 1. The upper threshold value may, in particular, be from 0.01 to 0.05 higher than the lower threshold value. Relatively small departures from the value 1 are sufficient to enable the control apparatus to distinguish between continuous operation and not-yet-continuous operation, in order to switch on compressor output as needed.

The greatest load value $B_{max}$ used for the control need not be the instantaneous load value. In many cases it is advantageous for the control apparatus to have a mean value generating means that calculates $B_{max}$ from instantaneous load values B accumulated over a period of time. In that way short-term variations can be omitted from consideration.

Another possibility is for the control apparatus to have a trend analyser that calculates $B_{max}$ from the variation in the instantaneous load values B. In that way, recognisable changes can be counteracted early.

In a preferred embodiment a controller is provided in association with the compressor arrangement, which controller controls the output of the compressor arrangement as a function of the difference between the actual value and the desired value of the suction pressure and the control apparatus varies the desired value as a function of $B_{max}$. With that output control, the suction pressure is monitored directly. That helps the desired highest possible suction pressure to be set with great reliability.

In a further development, the greater the difference between $B_{max}$ and the lower threshold value (in the case of a reduction in output) and/or the upper threshold value (in the case of an increase in output) the greater the desired value variation effected by the control apparatus may be. This leads to more rapid adaptation to the particular conditions.

The invention is explained in detail below with reference to a embodiment shown in the drawing.

Figure 2:
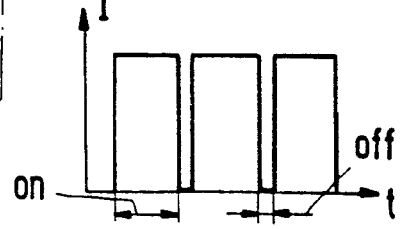

FIG. 1 is a diagrammatic representation of a refrigeration apparatus according to the invention, and FIG. 2 is a diagram showing current for the operation of the electro-magnetic valves.

A compressor arrangement 1 has, for example, three compressors 11, 12 and 13 which have a common pressure line 14 and a common suction line 15. The output of this compressor arrangement can be controlled by the number of compressors taken into operation as well as by individual control of a compressor, for example by means of rhythmic operation. The pressure line 14 leads to a condenser 2 with which a suction fan 21 for advancing a stream 22 of cooling air is associated. There follows a collector 3 from which liquid refrigerant 31 can be supplied by way of a feed line 32.

The refrigeration apparatus has a plurality of refrigeration chambers, three of which, refrigeration chambers 4, 5 and 6, are shown here by way of example. These refrigeration chambers may be at the same temperature or at different temperatures. Each refrigeration chamber is provided with an evaporator 41, 51, 61 with an electromagnetic valve 42, 52, 62 connected upstream of it. These series circuits are connected parallel to one another to the feed line 32. Each electro-magnetic valve is in series with an expansion valve 43, 53, 63 and forms with the latter a structural unit 44, 54, 64. Associated with each evaporator is a fan 45, 55, 65. In each refrigeration chamber and preferably in the stream of cooling air is the temperature sensor 46, 56, 66 of a thermostatic switch 47, 57, 67 which supplies the associated electro-magnetic valve 42, 52, 62 with actuation current I, and thus opens the valve, during temperature-dependent switch-on periods "on", and renders the associated electro-magnetic valve 42, 52, 62 currentless, and thus closes the valve, during switch-off periods "off". This is shown in FIG. 2. The periods of current flow correspond to the periods of refrigerant injection. Each thermostatic switch 47, 57, 67 is set to the desired temperature required for the associated refrigeration chamber.

The thermostatic switches 47, 57, 67 serve at the same time as state of load indicating means which communicate to a control apparatus 7, by way of the signal lines S1, S2 and S3, as state of load signals, the values "on" and "off". The control apparatus 7 contains a computation circuit 71 having a computer portion that calculates for each evaporator, as load value, the current switch-on ratio:

$$B = \frac{on}{on + off}$$

There follows a mean value generating means or trend analyser 72 which evaluates the load values B of each evaporator over a certain time period and supplies either a mean value or a trend value. In a comparator 73 the greatest load value $B_{max}$ is selected from the load values B determined in this way. Finally, in an allocating section 74 the greatest load value $B_{max}$ is compared with upper and lower threshold values which can be input via an input 75. As a function of this comparison, a time-delayed signal A is passed to a controller 8 which controls the output of the compressor arrangement 1, and thus determines the number of compressors 11, 12, 13 in operation and preferably also controls the instantaneous output of at least one compressor. The control of output is effected by means of a comparison of the actual value, supplied by way of an input 81, of the suction pressure with the desired value of the suction pressure generated in the controller section 82 under the influence of the signal A.

The capacity of an evaporator can be expressed as follows:

$$Q_O = k \times F \times LMTD$$

where k is the heat throughput number for the heat transfer from the cooled medium to the cooling medium, F is the area over which the heat transfer takes place, and LMTD is the logarithmic temperature difference between the cooling medium and the cooled medium, different values being produced as a function of whether the flow is a flow in the same direction, a counterflow or a crossflow.

The average load Q of an evaporator can be described with good approximation as follows $$Q = Q_0 \times \frac{on}{on + off} = k \times F \times LMTD \times \frac{on}{on + off}$$

Here, as already mentioned, "on" and "off" are the switch-on and switch-off periods of the thermostat. The load value $$B = \frac{on}{on + off}$$

gives the portion of the cycle in which the injection of the refrigerant into the evaporator takes place. It can be seen that the same average load of the evaporator can also be attained with a lower capacity $Q_O$, that is to say with a lower suction pressure and therefore a lower LMTD, if the load value B can be further increased. It is therefore possible to derive from the load value $B_{max}$ of the most heavily loaded evaporator a correction value A with the aid of which the desired value of the suction pressure is increased until $B_{max}$ reaches the preselected threshold.

In detail, the computation is effected in such a manner that the instantaneous value, the mean value or the trend value of B is determined for each evaporator and in a comparator 73 the greatest of those values is selected. If $B_{max}$ is below the lower threshold value set at the input 75, which is preferably in the region of from 0.90 to 0.95, the suction pressure of the compressor arrangement 1 can be increased, that is to say the compressor output reduced. If $B_{max}$ exceeds an upper threshold value that is slightly higher than the lower threshold value, but in any case is below 1.0, the suction pressure is reduced, that is to say the compressor output is increased.

In the first case, therefore, a signal A is sent from the control apparatus 7 to the controller 8 which effects an increase in the desired value of the suction pressure. In the second case, the signal A causes the desired value of the suction pressure to be reduced. In this case, the corrective influence can be the greater the more $B_{max}$ departs from the lower or the upper threshold value.

The invention can be used in conjunction with any desired compressors, such as piston compressors, rotary compressors, screw compressors and the like. The principle can be applied when there is a single compressor as well as when there are several compressors, even if those compressors have different capacities. The output control can be effected stepwise or steplessly, either by means of on/off rhythmic operation of the compressor or by using a variable speed.

I claim:

1. A refrigeration system, comprising, refrigeration apparatus including compressor means and control means for operating said compressor means, at least one evaporator unit including evaporator means connected to said compressor means, said unit having electromagnetic valve means for supplying refrigerant to said evaporator means, said unit including thermostatic switch means having an ON/OFF temperature range for operating said valve means including a temperature sensor adjacent to said evaporator means for influencing said switch means, said control means including computing means for periodically determining an actual load value with respect to said unit derived from the ON and OFF times of said switch means, said control means having an input for a desired load value range setting, said computing means having an output responsive to said setting for increasing the output of said compressor means at the upper threshold limit of said range setting and reducing the output of said compressor means at the lower threshold limit of said range setting.

2. A refrigeration system according to claim 1 including a second evaporator unit similar to and in parallel with said first referred to evaporator unit having an associated load value analogous to said first referred to load value which is also determined by said computing means, said control means being responsive to a selected one of said load values having the greatest magnitude.

3. A refrigeration system according to claim 1 wherein said actual load value is a mean value derived from related data accumulated over a period of time.

4. A refrigeration system, comprising, refrigeration apparatus including compressor means and control means for operating said compressor means, at least one evaporator unit including evaporator means connected to said compressor means, said unit having means for advancing a stream of cooling air, electromagnetic valve means for supplying refrigerant to said evaporator means, said unit including thermostatic switch means having an ON/OFF temperature range for operating said valve means including a temperature sensor means for sensing the temperature of air after it has passed over said evaporator means, said control means including computing means for periodically determining an actual load value with respect to said unit equal to the ratio of the ON time of said witch means to the ON+OFF time of said switch means, said control means having an input for a desire load value range setting, said computing means having an output responsive to said setting for increasing the output of said compressor means at the upper threshold limit of said range setting and reducing the output of said compressor means at the lower threshold limit of said range setting.

* * * * *